United States Patent [19]

Meyer et al.

[11] 4,233,273
[45] Nov. 11, 1980

[54] SELECTIVE EXTRACTION OF IRON AND ALUMINUM FROM ACIDIC SOLUTIONS

[75] Inventors: Gustavo A. Meyer; Simon O. Fekete, both of Arvada; Gordon R. Wicker, Lakewood, all of Colo.

[73] Assignee: Amax Inc., Greenwich, Conn.

[21] Appl. No.: 12,783

[22] Filed: Feb. 16, 1979

[51] Int. Cl.³ .......................... C01F 7/00; C01G 49/00
[52] U.S. Cl. ...................................... 423/112; 423/24; 423/49; 423/139; 423/157; 75/101 BE
[58] Field of Search .................... 423/112, 139, 24, 49, 423/157; 75/101 BE

[56] References Cited

U.S. PATENT DOCUMENTS

| | | | |
|---|---|---|---|
| 3,586,481 | 6/1971 | Hyde et al. | 423/112 |
| 3,875,285 | 4/1975 | Nyman et al. | 423/139 |
| 4,032,613 | 6/1977 | Shultze et al. | 75/101 BE |

OTHER PUBLICATIONS

Sato et al, "Proceedings of the International Solvent Extraction Conference, 1971", Paper 98, vol. 1, Soc. of Chemical Industry, London, 1971.
Blake et al, "Proceedings of International Conference on Peaceful Uses of Atomic Energy", vol. 28, 1958, pp. 289–298.
van Dalen et al, "Proceedings of the International Solvent Extraction Conference, 1971", Paper 84, vol. II, Soc. of Chemical Industry, London, 1971.

*Primary Examiner*—Herbert T. Carter
*Attorney, Agent, or Firm*—Michael A. Ciomek; Eugene J. Kalil

[57] ABSTRACT

A method is provided for extracting at least one of the trivalent ions Fe and Al from an acid solution. The method comprises uniformly mixing the acid solution with a liquid organic extractant comprising an organophosphorus compound and an alkylaromatic sulfonic acid dissolved in a water-immiscible organic solvent, the extractant being selective to the solvent extraction of said trivalent ions under acidic conditions. The molar ratio of the sulfonic acid to the organophosphorus compound is controlled over a range of about 1:4 to 10:1 and the mixing carried out for a time sufficient to effect solvent extraction of said trivalent ions and provide a raffinate substantially impoverished in said trivalent ions and a loaded extractant containing said trivalent ions, following which the loaded extractant is separated from the raffinate.

9 Claims, 1 Drawing Figure

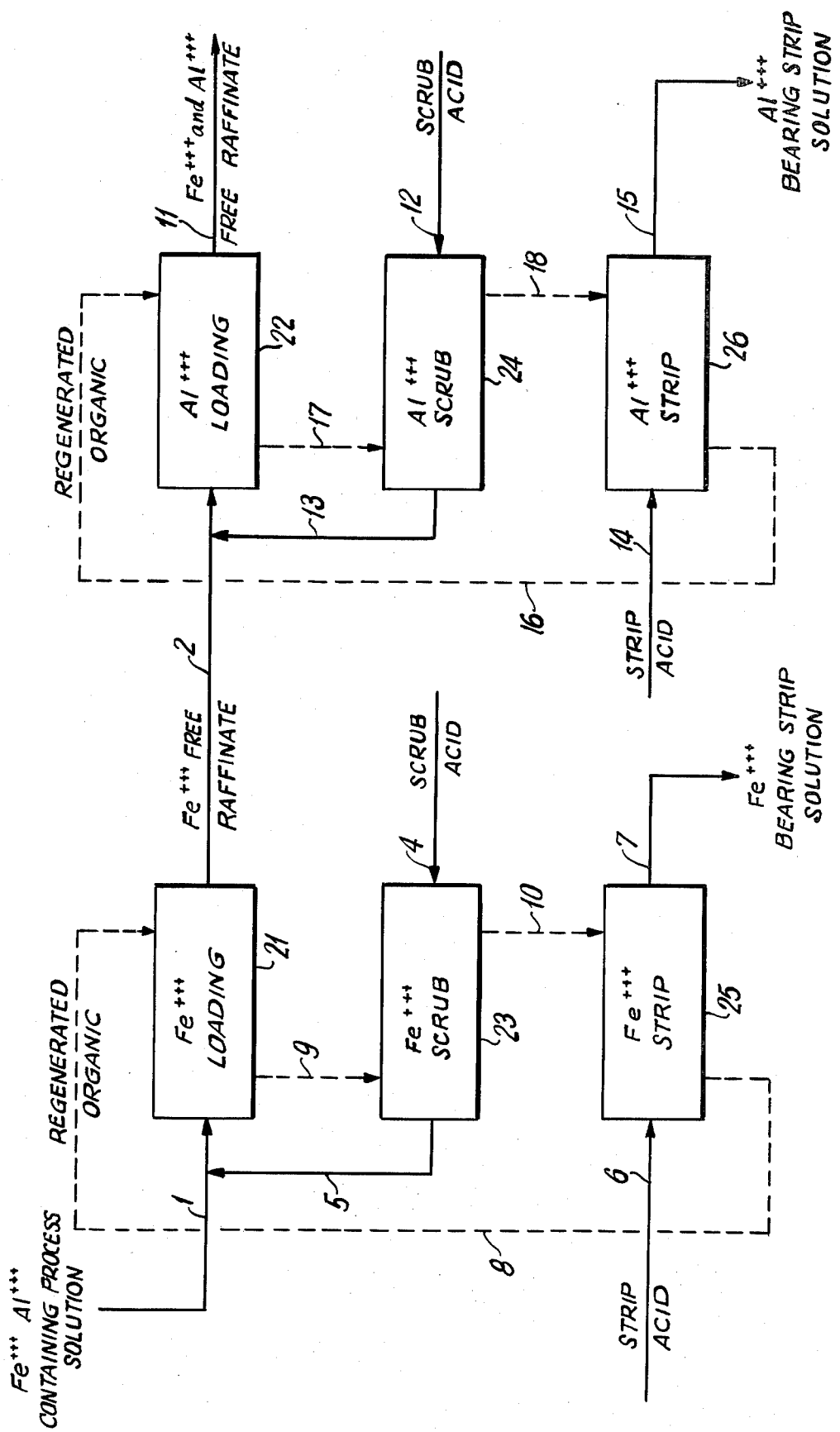

SELECTIVE EXTRACTION OF IRON AND ALUMINUM FROM ACIDIC SOLUTIONS

This invention relates to the separation of the trivalent ions $Fe^{+3}$ and $Al^{+3}$ from mineral acid solutions containing at least one of said ions and, in particular, from aqueous process solutions containing metal values in the divalent state.

State of the Art

Iron and aluminum are generally present as impurities in most hydrometallurgical process solutions and generally their removal is required prior to the recovery of metal values from such solutions. The removal of these impurities is usually achieved by neutralization of the acid in solution or by high temperature hydrolysis. The removal of the foregoing trivalent ions is important in the leaching of nickeliferous materials, such as nickel mattes, nickel-copper mattes, nickeliferous oxide ores, and the like material.

Many processes are known for the removal of $Fe^{+3}$ and $Al^{+3}$ ions from aqueous solutions. Such processes generally comprised precipitation, solvent extraction, ion exchange, and other techniques. However, most processes require substantial neutralization of any free acid present in the aqueous solution, or require high temperature and high pressure equipment, which processes involve substantial increase in overall process capital and operating costs.

It would be desirable to provide a solvent extraction process for removing trivalent ions of iron and aluminum from acid solutions without neutralizing the acid and thereby effect a saving in acid consumption and cost.

OBJECTS OF THE INVENTION

One object of the invention is to provide a process for removing at least one of the trivalent ions iron and aluminum from acid solutions containing at least one of said ions by solvent extraction.

Another object is to provide a process for separating the trivalent ions of iron and aluminum from pregnant liquors containing metal values in the divalent state, such as nickel and copper.

These and other objects will more clearly appear when taken in conjunction with the following disclosure, the appended claims and the accompanying drawing which is a flow sheet of one embodiment of the invention.

STATEMENT OF THE INVENTION

One embodiment of the invention resides in a process for removing at least one of the trivalent ions Fe and Al from an acid solution by solvent extraction by uniformly mixing the acid solution with a liquid organic extractant comprising an organophosphorus compound and a sulfonic acid dissolved in a water-immiscible organic solvent and which is selective to the solvent extraction of said trivalent ions under acidic conditions, the molar ratio of the sulfonic acid to the organophosphorus compound ranging from about 1:4 to 10:1, continuing the mixing for a time sufficient to effect solvent extraction of said trivalent ions and provide a raffinate substantially impoverished in said trivalent ions and a loaded extractant containing said trivalent ions, and then separating the loaded extractant from the raffinate.

The process is particularly advantageous in that the trivalent ions can be selectively extracted from acidic aqueous solutions of pH's less than about 4 and, more advantageously, less than about 2.

Although the process can be used to treat any acidic solution, such as the separation and recovery of iron and aluminum from bauxite or clay acidic solutions, the invention is particularly applicable to the treatment of pregnant solutions, such as laterite leach solutions containing divalent nickel, divalent cobalt, and, depending upon the ore, copper, magnesium, manganese, chromium, zinc, etc.

As stated hereinbefore, the process of the present invention is advantageously used to treat acidic process solutions having pH values below about 4 and usually below about 2. In fact, it has been found that the separation of ferric iron and aluminum from other metals in the process solution is more complete if the pH value of process solution is maintained below about 2, advantageously below about 1.5. Although the process of the present invention will extract ferric iron and/or aluminum from process solutions having pH values far lower than heretofore thought practical, the free acid concentration should preferably be maintained below about 100 gpl as higher free acid concentrations render the process less efficient. Other than an initial acid adjustment, further pre-treatment of the leach liquor is unnecessary.

Extraction of ferric iron and/or aluminum from pregnant leach liquor is effected by contacting the leach liquor with a liquid organic extractant selective to the removal of said trivalent ions as set forth in greater detail hereinafter. Any apparatus that provides good liquid-liquid contact between the organic and aqueous phases can be used. Advantageously, the extraction process is conducted on a counter-current basis, either with a series of mixing-settling stages or in one or more extraction columns. Extraction can be conducted at ambient temperatures or at elevated temperatures up to about 80° C.; advantageously the process is conducted at temperatures between about 10° C. and about 60° C.

Liquid organic extractants which can be employed contain organophosphorus compounds and sulfonic acids dissolved in water-immiscible organic solvents. Tests have shown that the relative amounts of organophosphorus compounds and sulfonic acids employed have an impact on both the selectivity and the extent of extraction (i.e., recovery). Acceptable selectivity and commercially attractive recoveries are achieved if the molar ratio of sulfonic acids to organophosphorus compounds is maintained between about 1:4 and about 10:1. More preferred results are realized if the molar ratio of sulfonic acids to organophosphorus compounds is maintained between about 1:2 and about 10:1. The liquid organic extractant can also contain other conditioners which perform specific functions. However, such conditioners are not necessary. For example, conditioners such as tributylphosphate or long chain alcohols (i.e., about 8 carbon atoms) can be optionally incorporated in the organic extractant in amounts of up to about 30% by weight, advantageously in amounts between 0.5% and about 10% by weight, to facilitate separation of the organic phase from the process solution after the metal value ions have been extracted from the aqueous phase.

The following organophosphorus compounds may be advantageously used in carrying out the invention:

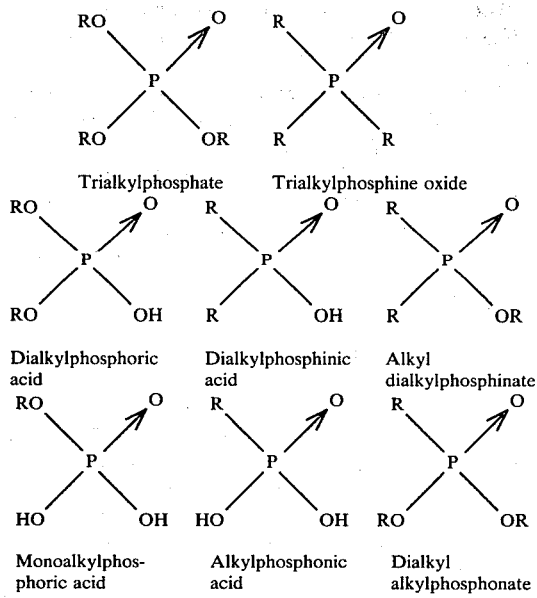

where R is generally a long chain hydrocarbon which makes the reagent compatible with a variety of water-immiscible organic solvents, which exhibit a low solubility in the aqueous phase and which provide good stability under ordinary processing conditions. Examples of useful radicals are n-octyl, 2-ethylhexyl, 3,5,5-trimethylhexyl, 2-ethyl-4-methylpentyl, 2-propyl-4-methylpentyl, octyl-2, diisobutylmethyl, 8-phenylpropyl, penyl-2-ethylhexyl, n-decyl, n-octyl, 2,6,8 trimethylnonyl-4,3,9-diethyltridecanol-6. Some specific examples of useful organophosphorus compounds are di (2 ethylhexyl) phosphoric acid, di (2-ethylhexyl) phosphonic acid, phenylphosphonic acid, tri-n-octyl phosphine oxide, monododecylphosphoric acid.

The sulfonic acids incorporated in the organic extractant have the general formula:

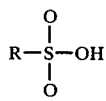

where R is an alkylaromatic hydrocarbon substituent. The alkyl-aromatic sulfonic acid preferably has a molecular weight of at least about 300. A preferred acid is one having at least two alkyl groups on the aromatic sulfonic acid nulceus. If a phenyl nucleus is present, the foregoing requirements are met with a benzene sulfonic acid containing at least two alkyl groups having a total of twenty carbon atoms, such as didecylbenzene sulfonic acid; or the acid may be tetrapentylbenzene sulfonic acid.

In addition, the nucleus may be a polycyclic, for example, naphthalene, anthracene, phenanthrene, tetrahydronaphthalene, and the like. Many variations are possible and contemplated in the position of substitution. The alkyl substituents can be straight or branched chain. A preferred sulfonic acid is dinonylnaphthalene sulfonic acid. Dodecylbenzene sulfonic acid may also be used, as well as didecylbenzene sulfonic acid.

The solvents should be immiscible with water, should dissolve substantial amounts of the organophosphorus compound and sulfonic acids, should be inert to concentrated mineral acid solutions, and should dissolve the iron and aluminum reaction products formed when the aqueous phase is contacted with the organic phase. These properties are generally found in liquid hydrocarbon solvents containing aliphatic and/or aromatic and/or cyclic compounds in any combination. Specific examples are kerosene, mineral spirits, naphtha, toluene, benzene and xylene.

The organic extractant should contain, on a weight basis, at least about 0.1% of the organophosphorus compound, at least about 1% of the sulfonic acid and may optionally contain up to about 30% of at least one conditioner selected from the group consisting of long chain alcohols or tributylphosphate, all dissolved in a water-immiscible organic solvent. Advantageously, the liquid extractant contains between about 1% and about 40% organophosphorus compound, between 5% and about 20% sulfonic acids and between about 0.5% and about 30% of a conditioner, all dissolved in a water-immiscible organic solvent. Most advantageously, the liquid extractant contains between about 1% and about 10% organophosphorus compound, between about 10% and 20% sulfonic acids and between 1% and about 10% of a conditioner all dissolved in a water-immiscible organic solvent. Liquid extractants falling within the foregoing compositioned ranges are particularly advantageous in that they provide effective and efficient separation of trivalent ions from highly acid solutions while minimizing materials handling problems.

After substantially all of the trivalent ions have been extracted into the organic phase, the loaded extractant is separated from the treated process solution (raffinate). The raffinate can be treated to recover the other dissolved metals or recycled to earlier process stages where full advantage can be taken of the unneutralized acid as well as any free acid generated by the extraction of the trivalent ions from the process solution.

The loaded extractant is treated to recover the ferric iron and aluminum values and to regenerate the liquid organic extractant for further use. Ferric iron and aluminum values contained in the loaded extractant can be recovered by contacting the loaded extractant with an aqueous solution of a mineral acid, such as sulfuric acid, hydrochloric acid, nitric acid or mixtures thereof. Stripping of the loaded extractant is advantageously accomplished by using at least about 2 normal (N), and advantageously between 4 N and about 12 N, acid solutions. Stripping can be conducted batchwise, semi-continuously or continuously; in any event, countercurrent principles are advantageously used. Equipment similar to that used for extraction can be employed for stripping.

Iron and aluminum can be recovered from the aqueous stripping solution by known processes or this solution may be recycled to earlier steps in the process, and the regenerated liquid organic extractant is recycled to extract further quantities of iron and aluminum from the pregnant solution.

Although iron and aluminum can be stripped from the loaded organic extractant as the loaded extractant emerges from the loading stage, the loaded extractant is advantageously first scrubbed with an aqueous acid solution of intermediate strength, e.g., between about 0.5 N and about 4 N to strip other metals from the loaded extractant. Scrubbing before stripping of iron and aluminum assures products having acceptable purity levels. Scrubbing can be conducted in the same manner and in the same apparatus as described for stripping except that the scrubbing solution is not as concentrated as the stripping solution.

Not only is the process in accordance with the present invention useful in recovering both iron and aluminum from acidic process solutions, but it is also useful in separately recovering iron and aluminum from process solutions and in separating iron from aluminum from solutions containing both iron and aluminum.

Separate recovery and separation of iron and aluminum is accomplished by taking advantage of the higher affinity of sulfonic acid and organophosphorus compound mixtures toward iron than that toward aluminum. Methods to achieve separation between iron and aluminum include restricting the ratio of organic to aqueous in a first extraction stage so that only iron will extract, thereby leaving the aluminum in the aqueous raffinate leaving the iron extraction stage and performing a second extraction for aluminum in a separate operation. The separation can be enhanced by scrubbing the aluminum from the organic extract with an intermediate strength aqueous acid solution of 0.5 N to 4 N, merging the scrub solution with the raffinate from the iron extraction and then performing a second extraction for aluminum on the combined raffinate and scrub solution streams.

Alternatively, iron and aluminum can be co-extracted to produce an aqueous raffinate substantially free of ferric iron and aluminum and a loaded organic extractant containing substantially all the ferric iron and aluminum but substantially free of other impurities, then contacting the loaded organic extractant with a strip solution of intermediate acid strength of 2 N to 6 N in a series of countercurrent stages to produce a strip solution containing substantially all the aluminum while leaving substantially all the ferric iron in the organic phase. Then the iron-bearing organic extractant is stripped in a second stage with an aqueous acidic solution that is more concentrated than that employed in the aluminum stripping stage, advantageously 4 N to 12 N. Substantially all the iron is stripped from the organic extractant while the organic extractant is regenerated for recycling to the extraction stage.

An advantageous combination of stages to achieve separation between ferric iron, aluminum and divalent elements is shown in the accompanying flowsheet. With reference to the flowsheet, the blocks designated as Ferric Iron Loading 21, Aluminum Loading 22, Ferric Iron Scrubbing 23, Aluminum Scrubbing 24, Ferric Iron Stripping 25, and Aluminum Stripping 26 represent a series of countercurrent contactors such as mixer-settlers, pulse columns, or similar devices commonly used in solvent extraction. The aqueous feed solution, (containing ferric iron, aluminum and divalent elements customarily encountered in solutions resulting from the hydrometallurgical treatment of iron- and aluminum-bearing ores) is introduced into ferric iron loading stage 21 where it is contacted with stream 8 which is an organic mixture containing sulfonic acid and an organophosphorus compound as active ingredients.

After a suitable manner of countercurrent contacting stages, the aqueous raffinate, substantially free of ferric iron, leaves as stream 2 and is then introduced into aluminum-loading stage 22. The loaded organic extractant stream 9 leaving ferric iron-loading stage 21 contains substantially all the ferric iron with some impurity elements. Stream 9 enters ferric iron scrub stage 23 where it is contacted countercurrently with a scrub solution containing free acid, preferably between about 1 N and about 4 N. The volume of the scrub solution relative to the volume of the loaded organic extractant stream 9 can vary over a wide range depending upon its acid strength, the amount of impurities in the loaded extractant, the number of countercurrent stages and the amounts of sulfonic acid and organophosphorus compound contained in the organic phase. The objective is to remove substantially all the impurity elements contained in stream 9 with a minimum of ferric iron being removed. The scrub solution containing the scrubbed impurity elements emerges as stream 5, joins stream 1 entering the ferric iron-loading stage, and eventually exits in stream 2.

The scrubbed organic stream 10 substantially free of divalent elements and aluminum, but containing substantially all the ferric iron introduced in stream 1 is introduced into stripping stage 25 where in countercurrent contact with an aqueous solution of a mineral strip acid 6, advantageously between 4 N and about 12 N, the iron is substantially completely removed from the organic phase and emerges as stream 7 which is further processed to recover a purified form of iron or it is returned to early stages of the process. The stripped organic phase, which is now regenerated, leaves as stream 8 for another cycle in ferric non-loading 21.

Stream 2, the ferric iron-free raffinate, is conveyed to the aluminum circuit. The aluminum circuit is similar to the ferric iron circuit in its purpose and equipment arrangement. Thus, stream 2 enters aluminum-loading stage 22, where in countercurrent contact with an organic extractant stream 16, substantially all the aluminum and some of the impurity elements are extracted into the organic phase. The ferric iron and aluminum free aqueous raffinate leaves as stream 11 and is recycled to early stages of the process, or suitably treated for recovery of other metals, if justified.

The loaded organic extractant stream 17 is scrubbed with an acidic solution 12 in a similar manner described for the ferric iron scrubbing. The scrub solution 13 joins stream 2 and eventually leaves the circuit in stream 11. The scrubbed organic extractant stream 18, substantially free of divalent elements, but containing substantially all the aluminum contained in stream 1, is then conveyed to aluminum stripping stage 26 where substantially all the aluminum is removed from the loaded organic extractant by countercurrent contacting with strip acid 14, producing an acidic aluminum solution 15 for further processing and recovery aluminum. The regenerated organic stream 16 is returned for another cycle to aluminum-loading stage 22.

It should be understood that the flowsheet depicted in the drawing and the description given above in no way represents a limitation or restriction to the particular arrangements shown. Numerous other configurations are possible depending upon the composition of the aqueous feed solution, desired purity of the iron and aluminum products, the composition of the organic with respect to sulfonic acid and organophosphorus compound content and end use of the ferric iron and aluminum free aqueous raffinates.

In order to give those skilled in the art a better understanding of the advantages of the present invention, the following illustrative examples are given.

To facilitate ease of interpretation of the data contained in the examples, terminology customarily employed in solvent extraction was adopted. The terms used are defined as follows:

Concentrations are expressed in milliequivalents per liter. In the examples nickel, cobalt, manganese, magnesium and free sulfuric acid are present in their divalent form, aluminum in the trivalent form and iron in the trivalent form or in combination of divalent and trivalent form.

Distribution coefficients represent the arithmetic ratio of concentration of a species in the organic over that in the aqueous phase.

Separation factor represents the arithmetic ratio of the distribution coefficients of two species, or the ratio of one species to a group of species, or a group of species to another group of species. This term is a measure of the degree of separation between species.

EXAMPLE 1

To illustrate the necessity for the presence of both sulfonic acid and organophosphorus compounds in the organic extractant to achieve synergism with respect to extraction of trivalent ions from aqueous acidic solutions, three tests were performed. The aqueous feed solution was a pregnant leach solution (before contact with the organic phase) containing in milliequivalents per liter (meq/l), 163.5 $Ni^{2+}$, 6.8 $Co^{2+}$, 26.5 $Fe^{2+}$, 62.3 $Fe^{3+}$, 23.7 $Mn^{2+}$, 1184.7 $Mg^{2+}$, 61.2 $Al^{3+}$, 5.4 $Cr^{3+}$, and 398.6 free $H_2SO_4$.

The aqueous solution (having a pH value of about 0.6) was contacted with an equal volume of organic extractant solution containing dinonylnaphthalenesulfonic acid (DNNS) or di-(2-ethylhexyl)-phosphoric acid (D2EHPA) or both, all dissolved in naphtha, with isodecanol as a modifier, by shaking in a separatory funnel for about 5 minutes at about 50° C. and then allowed to separate, upon which the two phases were analyzed for their metal content. Table 1 shows the results obtained. The distribution coefficients indicate that, when the sulfonic acid is used as an active ingredient in the organic, all elements extract in about the same proportions. No useful selectivity exists. Using the organophosphorus compound alone as the active extractant yields practically no extraction into the organic phase; however, the presence of both the sulfonic acid and the organophosphorus compound gives rise to a surprising degree of synergism with respect to ferric iron and aluminum and to a lesser extent manganese while nickel, cobalt, ferrous iron, chromium, zinc and magnesium extraction is slightly suppressed.

The distribution coefficient of ferric ($Fe^{3+}$) and ferrous ($Fe^{2+}$) ions are very different from that of aluminum. Thus, changing the oxidation state of iron in the solution would allow for a very simple iron-aluminum separation in acid solutions. Also, by making use of this difference in distribution coefficients, these three ions can easily be separated from each other either by selective loading or selective stripping.

EXAMPLE 2

To demonstrate that synergism with respect to the extraction of trivalent ions can be achieved using mixed extractants of various sulfonic acids and organophosphorus compounds, a series of tests was run using a mixed extractant containing several combinations of these compounds dissolved in naphtha with a 5% wt. isodecanol added as a modifier. The aqueous feed solution and the shake out test are identical to those described in Example 1.

Table 2 shows the results obtained. For convenience and clarity, the divalent ions were (including $Fe^{2+}$) consolidated into one group and contrasted with the trivalent ions ($Fe^{3+}$ plus $Al^{3+}$). Table 2 clearly indicates that addition of an organophosphorus compound to a sulfonic acid increases the selectivity with respect to trivalent ions.

TABLE 1

| Organic Extractant | | | | | | | | | | | |
|---|---|---|---|---|---|---|---|---|---|---|---|
| DNNS wt.% | D2EHPA wt.% | Extraction Streams | Ni | Co | $Fe^{3+}$ | $Fe^{2+}$ | Mn | Zn | Mg | Al | Cr | Free Acid |
| 15 | — | Organic Extract | 19.7 | 1.0 | 2.1 | 3.9 | 3.3 | 0.2 | 115.2 | 10 | 0.5 | — |
| | | Raffinate | 143.8 | 5.8 | 60.2 | 22.6 | 20.4 | 1.7 | 1069.5 | 51.2 | 4.9 | 547.6 |
| | | Distribution Coefficient | .14 | .17 | .03 | .17 | .16 | .12 | .11 | 0.20 | .10 | — |
| — | 10 | Organic Extract | Nil | Nil | 48.3 | Nil | Nil | Nil | 1.0 | Nil | Nil | — |
| | | Raffinate | 163.5 | 6.8 | 14.0 | 26.5 | 23.7 | 1.9 | 1183.7 | 61.2 | 5.4 | 439.0 |
| | | Distribution Coefficient | — | — | 3.5 | — | — | — | <.001 | — | — | — |
| 15 | 10 | Organic Extract | 12.3 | 0.6 | 58.0 | 4.3 | 4.8 | .2 | 90.5 | 36.7 | .5 | — |
| | | Raffinate | 151.8 | 6.2 | 4.3 | 22.2 | 18.9 | 1.7 | 1094.2 | 24.5 | 4.9 | 634.7 |
| | | Distribution Coefficient | .08 | .10 | 13.5 | .19 | .25 | .12 | .08 | 1.5 | .10 | — |

TABLE 2

| Sulfonic Acid | Organophosphorus Compound | Constituent | Constituent in Organic | Constituent in Raffinate | Distribution Coefficient | Separation Factor |
|---|---|---|---|---|---|---|
| 15% wt DNNS | — | Trivalent Ions | 12.1 | 111.4 | .11 | 1.0 |
| | | Divalent Ions | 143.8 | 1268.7 | .11 | |
| | | Free Acid | — | — | — | |
| | 12 wt% Tri-octyl Phosphine Oxide | Trivalent Ions | 1.6 | 121.4 | 0.01 | |
| | | Divalent Ions | 1.6 | 1412.0 | Nil | — |
| | | Free Acid | — | 392.5 | — | |
| 15% wt DNNS | 12 wt% Tri-octyl Phosphine Oxide | Trivalent Ions | 91.2 | 32.3 | 2.8 | 140 |
| | | Divalent Ions | 23.1 | 1388.7 | .02 | |
| | | Free Acid | — | — | — | |

EXAMPLE 3

The degree of selectivity with respect to trivalent ions, or, more specifically, with respect to ferric ($Fe^{3+}$) and aluminum ($Al^{3+}$) ions, can be influenced by varying the proportion of the organophosphorus compound in the organic relative to the sulfonic acid. A series of tests were carried out using an organic extractant containing 15% weight dinonylnaphthalene sulfonic acid, 5% weight isodecanol, varying proportions of di-2-ethylhexyl-phosphoric acid, with the balance being naphtha. The shake-out tests were performed using the procedure described in Example 1 using an aqueous feed solution containing, in milliequivalents per liter (meq/l), 197.6 $Ni^{2+}$, 16.3 $Co^{2+}$, 64.5 $Fe^{3+}$, 65.5 $Mn^{2+}$, 222.1 $Mg^{2+}$, 189 $Al^{3+}$, 18.5 $Cr^{3+}$, 410 free $H_2SO_4$.

For clarity and convenience, the divalent ions are included in one group and contrasted with $Fe^{3+}$ and $Al^{3+}$. Table 3 clearly indicates that increasing the amount of di-2-ethylhexyl phosphoric acid relative to the sulfonic acid leads to increasing selectivity with respect to $Fe^{3+}$ and $Al^{3+}$. These results also demonstrate that a variety of compositional combinations with respect to the sulfonic acid and the organophosphorus compound can be employed. This feature can be advantageously exploited in tailoring the organic composition to suit a particular need.

TABLE 3

| D2EHPA in Organic Extractant % wt | Constituent | Constituent in Organic Meq/l | Constituent in Raffinate Meq/l | Distribution Coefficient |
|---|---|---|---|---|
| Nil | $Fe^{3+}$ | 8.6 | 55.9 | .15 |
|  | $Al^{3+}$ | 66.7 | 122.3 | .55 |
|  | Divalent | 92.2 | 427.8 | .22 |
|  | Free Acid | — | 577.7 | — |
| 1 | $Fe^{3+}$ | 43.0 | 21.5 | 2.0 |
|  | $Al^{3+}$ | 77.8 | 111.2 | 0.70 |
|  | Divalent | 110.5 | 409.5 | .27 |
|  | Free Acid | — | 641.5 | — |
| 3 | $Fe^{3+}$ | 55.9 | 8.6 | 6.5 |
|  | $Al^{3+}$ | 101.1 | 87.9 | 1.15 |
|  | Divalent | 106.2 | 413.8 | .26 |
|  | Free Acid | — | 673.4 | — |
| 5 | $Fe^{3+}$ | 59.6 | 4.9 | 12.2 |
|  | $Al^{3+}$ | 122.3 | 66.7 | 1.83 |
|  | Divalent | 98.5 | 421.6 | .23 |
|  | Free Acid | — | 690.6 | — |

EXAMPLE 4

The distribution coefficients of the cations are influenced by the amount of free acid present in the aqueous solution. To illustrate this effect, three tests were performed using a mixed organic extractant containing 15% wt DNNS, 10% D2EHPA, 5% isodecanol with the balance mineral spirits, and aqueous acidic solutions containing 50 (meq/lt) $Fe^{3+}$, 50 (meq/lt) $Al^{3+}$ with three different levels of free $H_2SO_4$, 408 (meq/lt), 816 (meq/lt) and 1224 (meq/lt, respectively.

The shake-out tests were done using the same technique and conditions described in Example 1, and the results shown in Table 4. From this table, it is evident that the distribution coefficients of $Fe^{3+}$ and $Al^{3+}$ increase as the free acid concentration in the aqueous phase decreases.

TABLE 4

| Aqueous Feed Solution- Initial Free $H_2SO_4$ Meq/l | Organic Extract meq/l | | Raffinate meq/l | | | Distribution Coefficient | |
|---|---|---|---|---|---|---|---|
|  | $Fe^{3+}$ | $Al^{3+}$ | $Fe^{3+}$ | $Al^{3+}$ | Free $H_2SO_4$ | $Fe^{3+}$ | $Al^{3+}$ |
| 408 | 49.8 | 47.9 | 0.2 | 2.1 | 505.7 | 249.0 | 22.7 |
| 816 | 49.4 | 38.9 | 0.6 | 11.1 | 904.3 | 82.3 | 3.5 |
| 1224 | 48.7 | 30.0 | 1.3 | 20.0 | 1302.7 | 37.5 | 1.5 |

EXAMPLE 5

The distribution coefficient of the cations is influenced by the total concentration of the extractant in the organic phase. To illustrate this effect, three tests were performed using organic extractants containing a fixed weight ratio of sulfonic acid to organophosphorus compound, but three levels of concentration: 5 wt% DNNS, 3.3 wt% D2EHPA, 1.66 wt% isodecanol, balance mineral spirits; 10 wt% DNNS, 6.7 wt% D2EHPA, 3.3 wt% isodecanol, balance mineral spirits; and 15 wt% DNNS, 10 wt% D2EHPA, 5 wt% isodecanol, balance mineral spirits. The aqueous solutions contained about 104 (meq/l) of $Al^{3+}$ and about 360 (meq/l) free $H_2SO_4$. The tests were run in a manner similar to that described in Example 1 and the results presented in Table 5. This table clearly indicates that increasing the total concentration of the active extractants leads to an increase in the distribution coefficient of aluminum. Similar results are obtained for the other cations such as $Fe^{3+}$, $Fe^{2+}$, $Ni^{2+}$, $Co^{2+}$, $Cu^{2+}$, $Mn^{2+}$, $Cr^{3+}$, $Mg^{2+}$, etc.

TABLE 5

| Wt. % Organic Extractant | | | Feed Solution | | Organic Extract | Raffinate | | $Al^{3+}$ Distribution Coefficient |
|---|---|---|---|---|---|---|---|---|
| DNNS | D2EHPA | Isodecanol | $Al^{3+}$ | Free $H_2SO_4$ | $Al^{3+}$ | $Al^{3+}$ | Free $H_2SO_4$ |  |
| 5 | 3.3 | 1.66 | 104.5 | 359.0 | 62.3 | 42.2 | 421.3 | 1.5 |
| 10 | 6.7 | 3.33 | 104.5 | 359.0 | 91.2 | 13.3 | 450.2 | 6.9 |
| 10 | 10 | 5.00 | 102.3 | 428.0 | 94.5 | 7.8 | 522.9 | 12.1 |

EXAMPLE 6

In most practical applications, even though an organic mixture may show great selectivity towards trivalent ions, some divalent ions (impurities) will co-extract with these trivalent ions. Such co-extracted impurities can be scrubbed preferentially with relatively weak acidic aqueous solutions.

Two series of tests were carried out with an organic mixture consisting of 15% wt dinonylnaphthalene sulfonic acid, 10% wt di-(2-ethylhexyl) phosphoric acid, 5% wt isodecanol and the balance mineral spirits.

In the first series of tests, the above organic extractant was loaded with various elements to concentrations, in milliequivalents per liter, 11.6 $Ni^{2+}$, 1.1 $Co^{2+}$, 317.0 $Fe^{3+}$, 5.8 $Mn^{2+}$, 11.5 $Mg^{2+}$, 100.0 $Al^{3+}$, 1.4 $Cr^{3+}$ (by contacting one volume of the organic with seven volumes of the aqueous solution used in Example 3). Aliquots of this organic were contacted with one normal sulfuric acid solution at various phase ratios at 40° C. After separation and analysis of the two phases, the distribution of $Fe^{3+}$, $Al^{3+}$ and the divalent elements were computed, giving the results presented in Table 6A. It is evident from these results that the divalent elements can be preferentially removed and that a separation of iron and aluminum can be achieved by a suitable combination of acid strength and phase ratio.

In the second series of experiments, the organic extractant was loaded with various elements to concentrations, in milliequivalents per liter, 8.5 $Ni^{2+}$, 0.8 $Co^{2+}$, 5.8 $Mn^{2+}$, 9.0 $Mg^{2+}$, 385.6 $Al^{3+}$, 0.3 $Cr^{3+}$, by ten consecutive contacts of one volume of the partially loaded organic with one volume of fresh aqueous acidic solution containing, in milliequivalents per liter, 211.2 $Ni^{2+}$, 16.3 $Co^{2+}$, 80.1 $Mn^{2+}$, 230.3 $Mg^{2+}$, 188.9 $Al^{3+}$, 14.4 $Cr^{3+}$, 408.2 free $H_2SO_4$.

Aliquots of this loaded organic were contacted twice, consecutively, with a 0.2 normal sulfuric acid solution using the same conditions used in Example 1. The results of these tests, shown in Table 6B, indicate that, after the second contact, 98.7% of the impurities had been removed from the organic, leaving a purified organic containing 92.2% of the aluminum originally present in it.

TABLE 6A

| Phase Ratio Organic/Aqueous | Distribution - % of Total | | | | | |
|---|---|---|---|---|---|---|
| | $Fe^{3+}$ | | $Al^{3+}$ | | Impurities | |
| | Organic Phase | Aqueous Phase | Organic Phase | Aqueous Phase | Organic Phase | Aqueous Phase |
| 1:1 | 97.3 | 2.7 | 36.7 | 63.3 | 4.7 | 95.3 |
| 2:1 | 98.5 | 1.5 | 52.2 | 47.8 | 4.7 | 95.3 |
| 5:1 | 97.5 | 2.5 | 68.9 | 31.1 | 15.0 | 85.0 |

TABLE 6B

| Phase Ratio Organic/Aqueous | Distribution - % of Total | | | |
|---|---|---|---|---|
| | $Al^{3+}$ | | Impurities | |
| | Organic Phase | Aqueous Phase | Organic Phase | Aqueous Phase |
| First Contact | 95.7 | 4.3 | 14.3 | 85.7 |
| Second Contact | 92.2 | 7.8 | 1.3 | 98.7 |

As will be apparent, iron can be selectively separated from aluminum in the aqueous acid solution by employing a predetermined volume ratio of the liquid organic extractant to the aqueous acid solution. Any aluminum and divalent ions remaining in the loaded extractant can be thereafter removed by acid scrubbing and the scrubbing solution recycled for aluminum separation. As stated herein with respect to the flow sheet, after a suitable number of countercurrent contacting stages, the aqueous raffinate, substantially free of ferric iron, leaves as stream 2 and then enters the aluminum-loading stage 22.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of selectively extracting trivalent ions of Fe and Al from an acid solution of pH below 4 containing at least one of said ions and also containing at least one of said divalent ions which comprises, uniformly mixing said solution with a liquid organic extractant comprising by weight about 1% to 40% of an organophosphorus compound and about 5% to 20% of a sulfonic acid dissolved in a water-immiscible organic solvent, said organophosphorus compound being selected from the group consisting of

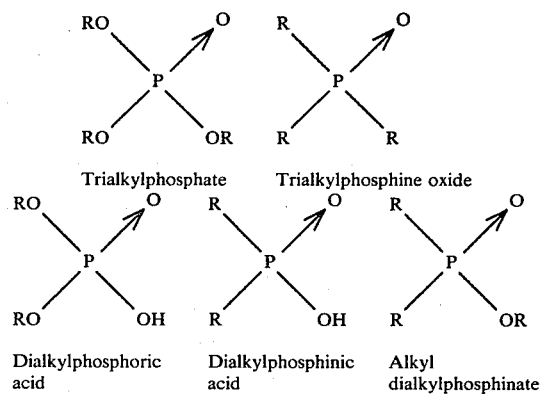

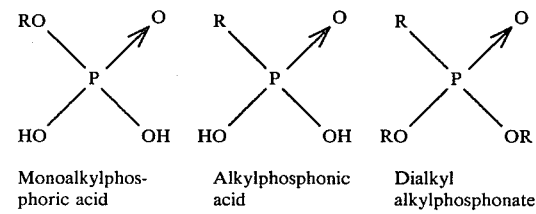

where R is a long hydrocarbon selected from the group consisting of n-octyl, 2-ethylhexyl, 3,5,5-trimethylhexyl, 2-ethyl-4-methylpentyl, 2-propyl-4-methylpentyl, octyl-2, diisobutylmethyl, 8-phenylpropyl, phenyl-2-ethylhexyl, n-decyl, n-oxtyl, 2,6,8-trimethylnonyl-4 and 3,9-diethyltridecanol-6, said sulfonic acid having the general formula

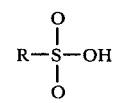

where R is an alkylaromatic hydrcarbon substituent and the mol weight of the sulfonic acid is at least 300 the molar ratio of said sulfonic acid to said organophosphorus compound being 1:4 to 10:1, continuing said mixing for a time sufficient to effect solvent extraction of at least one of said trivalent ions and provide a raffinate impoverished in said trivalent ions and containing at least one of said divalent ions and a loaded extractant containing said trivalent ions, separating said loaded extractant from said raffinate, stripping said trivalent ions iron and aluminum from the loaded organic extractant in two stages, wherein in the first stage the aluminum is selectively stripped by contacting the loaded extractant with a mineral acid of concentration ranging from about 2 N to 6 N while leaving substantially all of the trivalent iron in the extractant, and wherein in the second stage, the trivalent iron is stripped from the extractant by contacting it with a mineral acid of concentration greater than that used in the first stage and ranging from about 4 N to 12 N, the organic extractant being regenerated for recycling into the process.

2. The method of claim 1, wherein said liquid extractant contains up to about 30% by weight of an organic conditioner and wherein the temperature ranges up to about 80° C.

3. The method of claim 2, wherein the conditioner is selected from the group consisting of long chain alcohols and tributylphosphate, and wherein the sulfonic acid is dinonylnaphthalene sulfonic acid.

4. The method of claim 2, wherein the water immiscible organic solvent is a liquid hydrocarbon selected from the group consisting of aliphatic, aromatic and cyclic compounds, wherein the amount of organophosphorus compound ranges from about 1% to 10% by weight, wherein the amount of sulfonic acid ranges from about 10% to 20% by weight, wherein the pH is below 2, and wherein the temperature ranges from about 10° C. to 60° C.

5. A method of selectively extracting trivalent ions of Fe and Al from process acid solution containing said trivalent ions and also containing at least one divalent ion selected from the group consisting of Ni, Co, Fe, Cu, Mn and Mg which comprises, uniformly mixing said solution with a feed liquid organic extractant comprising an organophosphorus compound and a sulfonic acid dissolved in a water-immiscible organic solvent, said organophosphorus compound being selected from the group consisting of

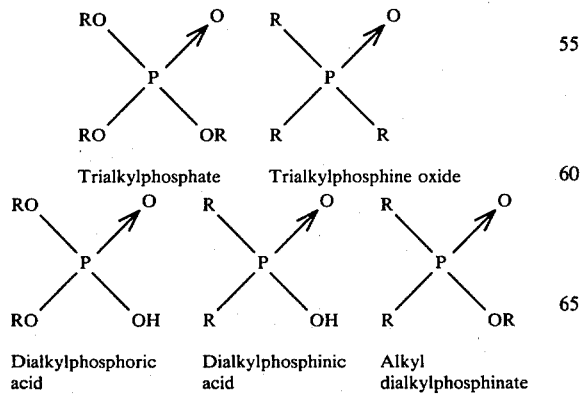

Trialkylphosphate   Trialkylphosphine oxide

Dialkylphosphoric   Dialkylphosphinic   Alkyl
acid                acid                dialkylphosphinate -continued

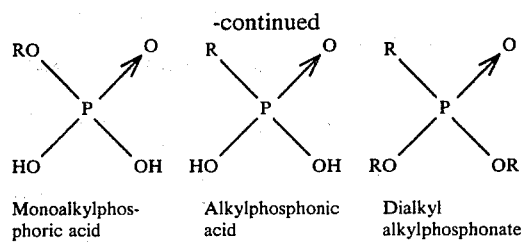

Monoalkylphos-   Alkylphosphonic   Dialkyl
phoric acid      acid              alkylphosphonate where R is a long chain hydrocarbon selected from the group consisting of n-octyl, 2-ethylhexyl, 3,5,5-trimethylhexyl, 2-ethyl-4-methylpentyl, 2-propyl-4-methylpentyl, octyl-2, diisobutylmethyl, 8-phenylpropyl, phenyl-2-ethylhexyl, n-decyl, n-octyl, 2,6,8 trimethylnonyl-4 and 3,9-diethyltridecanol-6, said sulfonic acid having the general formula

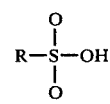

where R is an alkylaromatic hydrocarbon substituent and the mole weight of the sulfonic acid is at least 300 the molar ratio of said sulfonic acid to said organophosphorus compound being 1:4 to 10:1, continuing said mixing for a time sufficient to effect solvent extraction of at least said trivalent iron in an iron extraction stage and provide a first raffinate impoverished in at least said iron and containing at least one of said divalent ions and a first loaded extractant containing at least said trivalent iron, separating said first loaded extractant from said raffinate, scrubbing said loaded extractant with a first mineral acid scrubbing solution of concentration ranging from about 0.5 N to 5 N to effect extraction of aluminum and divalent ions from said extractant while leaving iron in said first extractant, separating the first loaded extractant from said first scrubbing solution, stripping the iron from said scrubbing first extractant by mixing said extractant with a mineral acid of concentration ranging from about 4 N to 12 N and produce an acid solution containing said trivalent iron and regenerate said organic extractant, recycling said regenerated organic extractant for further extraction of said trivalent iron from process solutions, merging said first scrubbing solution with the feed extraction in the iron extraction stage and provide said first raffinate for the subsequent recovery of aluminum therefrom, mixing said merged solutions with a second liquid organic extractant of the aforementioned composition for a time sufficient to effect solvent extraction of at least said trivalent aluminum and form a second loaded organic extractant and a second raffinate substantially impoverished in iron and aluminum, separating said second raffinate from said second loaded extractant, scrubbing said second loaded extractant with a second mineral acid scrubbing solution of concentration ranging from about 0.5 N to 5 N to effect extraction of divalent ions from said second extractant while leaving aluminum therein, separating said scrubbing solution from said second extractant, and then stripping aluminum from said second extractant by contacting it with a mineral acid of concentration higher than said scrubbing solution and ranging from about 4 N to 12 N, thereby regenerating said second organic extractant and produce an aqueous solution containing aluminum, separating said regenerated second extractant from said aluminum-containing solution and recycling said regenerated second extraction for treatment of said first raffinate solution.

6. The method of claim 5, wherein said liquid extractant contains up to about 30% by weight of an organic conditioner and wherein the temperature ranges up to about 80° C.

7. The method of claim 6, wherein the conditioner is selected from the group consisting of long chain alcohols and tributylphosphate, and wherein the sulfonic acid is dinonylnaphthalene sulfonic acid.

8. The method of claim 5, wherein the water immiscible organic solvent is a liquid hydrocarbon selected from the group consisting of aliphatic, aromatic and cyclic compounds, wherein the amount of organophosphorus compound ranges from about 1% to 10% by weight, wherein the amount of sulfonic acid ranges from about 10% to 20% by weight, wherein the pH is below 2, and wherein the temperature ranges from about 10° C. to 60° C.

9. The method of claim 5, wherein the volume ratio of the first liquid extractant to the acid solution is predetermined to selectively extract substantially the ferric iron from solution and provide said first raffinate containing substantial amounts of said aluminum.

* * * * *